Nov. 16, 1965    D. W. RHYS ETAL    3,217,404
PLATINUM METAL FABRICATION
Filed April 22, 1963
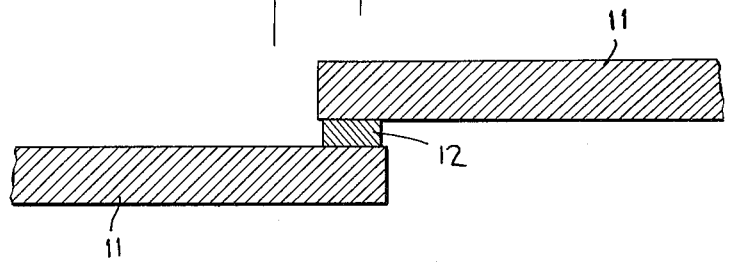
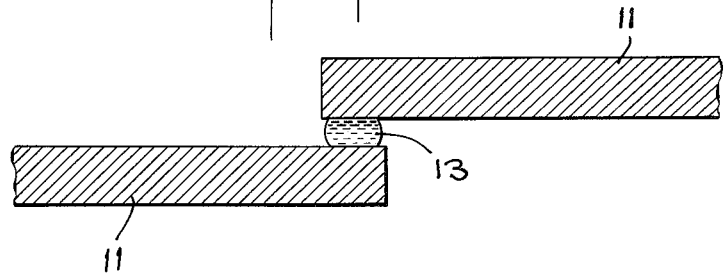
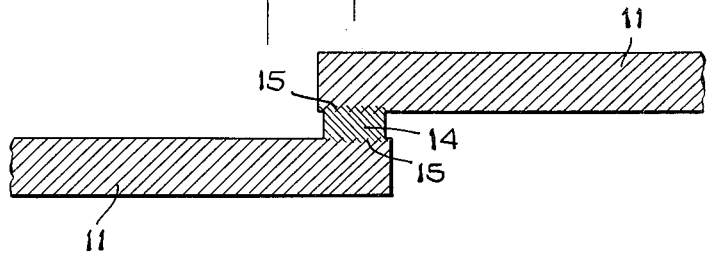
INVENTORS
DAVID WADE RHYS
BY ROY DAVID BERRY
JW Pinel
ATTORNEY

3,217,404
PLATINUM METAL FABRICATION
David Wade Rhys, Hounslow, and Roy David Berry, High Wycombe, England, assignors to The International Nickel Company, Inc., New York, N.Y., a corporation of Delaware
Filed Apr. 22, 1963, Ser. No. 274,443
Claims priority, application Great Britain, Apr. 26, 1962, 16,006/62
5 Claims. (Cl. 29—498)

The present invention relates to uniting platinum metal components and, more particularly, to production of platinum metal articles, fabrications and/or structures for service at elevated temperatures.

It is well known that platinum and alloys of platinum are used in the glass industry to form, or in sheet form to line, various articles or structures such as crucibles in which the glass is heated to temperatures in the range of 1300° C. to 1700° C., e.g., 1450° C. Alloys capable of such use are those alloys in which platinum is the predominant constituent and which also contain alloying amounts, e.g., 0.5% or greater, of one or more metals of the platinum group such as, for example, alloys of platinum with up to 20% rhodium or up to 10% ruthenium or up to 20% palladium or up to 30% iridium. The platinum or any of the alloys may also contain small amounts of dispersion-hardening constituents such as thoria or alumina in, for example, amounts up to 1%. For the sake of convenience, platinum and these alloys will all be referred to as "platinum metal" in this specification.

Joints in an article or structure made from platinum metal sheet can be formed by brazing or welding. In brazing, the brazing metal or alloy is heated to a temperature which is only a little above its melting point and results in the production of a joint in which the platinum metal sheets are united by a layer of the brazing metal or alloy. Such a brazed joint is not suitable for service at temperatures above the melting point of the brazing alloy. In welding, the surfaces of the platinum metal sheets are melted; but if either sheet is of dispersion-hardened platinum or a dispersion-hardened platinum alloy, melting is undesirable because the improved properties obtained from the dispersed phase are lost. Dispersion-hardened platinum and such platinum alloys are characterized by a distinctive microstructure known to those skilled in the metallurgical art. This distinctive microstructure is no longer present if the dispersion-hardened platinum metal has been melted and a skilled metallurgist can ascertain whether or not a piece of dispersion-hardened metal has been melted.

Where a melting point of an alloy or metal is referred to herein, it is to be understood that alloys are frequently characterized by a melting range instead of a melting point. Accordingly, where an alloy or metal is characterized by a melting range the temperatures referred to herein as "above the melting point of the alloy" are temperatures above the upper limit of the melting range, i.e., above the liquidus, of the alloy or metal and temperatures referred to herein as "substantially below the melting point" are temperatures below the lower limit of the melting range, i.e., below the solidus, of the metal or alloy.

It has now been discovered that platinum metal can be united by a new process to produce articles, fabrications and structures suitable for use at temperatures of 1450° C. and higher.

It is an object of the present invention to provide a new process for uniting platinum metal to produce structures suitable for service at temperatures of 1450° C. or higher.

It is a further object of the invention to provide a new process for uniting dispersion-hardened platinum by use of a special brazing alloy to produce a structure suitable for service at temperatures higher than the melting point of the brazing alloy.

It is another object of the invention to provide platinum metal articles, fabrications and structures that are entirely resistant to melting at 1450° C.

Still another object of the invention is to provide platinum metal articles, fabrications and structures used in contact with molten glass at temperatures of 1450° C. or higher.

Other objects and advantages will become apparent from the following description taken in conjunction with the accompanying drawing in which:

FIGURE 1 is a cross sectional view of two portions of platinum metal in a brazeable relationship with a solid brazing alloy.

FIGURE 2 depicts the said two portions of platinum metal in a brazeable relationship with a liquid brazing alloy.

FIGURE 3 shows in cross section a fabrication comprising portions of platinum metal united by a solid alloy of platinum metal with a brazing alloy.

Generally speaking the present invention contemplates uniting faying portions of at least one component of platinum metal to produce an article, fabrication or structure which is serviceable at temperatures of up to about 1450° C. and higher. According to the invention, portions of at least one component of platinum metal are assembled or placed in mutual faying brazeable relationship with a special brazing alloy. The assembly is then heated to a temperature that exceeds the melting point of the brazing metal and is substantially below the melting point of the platinum metal of the component to melt the brazing alloy. Further, the assembly is maintained at such a temperature to diffuse platinum metal of the component wholly into the brazing alloy and thereby raise the melting point of the brazing alloy to a temperature of at least about 1450° C. and above the temperature to which the structure is to be subjected in service while maintaining the relative positions of the faying portions. A platinum metal component that is united in accordance with the invention is of a platinum metal selected from the group consisting of platinum, dispersion-hardened platinum, platinum-base alloys and dispersion-hardened platinum-base alloys, said platinum-base alloys and said dispersion-hardened platinum-base alloys containing at least one metal from the group consisting of up to about 40% iridinum, up to about 5% osmium, up to about 50% palladium, up to about 40% rhodium, and up to about 15% ruthenium by weight with the balance essentially platinum in amounts greater than about 50%. Brazing alloys for use in accordance with the invention are essentially binary alloys of palladium and a metal selected from the group consisting of gold in amounts by weight of about 0% to about 100% and copper in amounts by weight of about 0% to about 100%. Articles, fabrications and structures suitable for service at temperatures of at least 1450° C. are entirely resistant to melting, i.e., are not susceptible to melting or even incipient melting, when heated to 1450° C.

In other words, according to the invention two pieces of platinum metal sheet to be joined are united by brazing with the use of the special brazing metal which is of melting point lower than that of the pieces and which is held molten between the pieces for a time long enough for platinum to diffuse wholly into it and raise its melting point to a temperature above that to which the final article will be subjected in service. Simultaneously there will be diffusion of the constituents of the liquid brazing metal into the surface of the platinum metal, and this will inevitably lower the melting point of the platinum metal. Accordingly, it is necessary to use a special brazing alloy such that after diffusion the melting point of the platinum metal remains high enough to resist the temperature to which the platinum metal is subjected in use.

Referring now to the drawing, FIGURE 1 shows two faying portions of platinum metal sheet 11 in lap-joint brazeable relationship with brazing alloy foil 12 inserted in the clearance and in mutual contact with the platinum metal. The clearance between faying portions of platinum metal components disposed in brazeable relationship in accordance with the invention is from about 0.001 inch to about 0.01 inch. FIGURE 2 depicts the platinum metal and molten brazing alloy 13 in an initial stage of a process of the invention. FIGURE 3 shows a fabrication of two platinum metal sheets united in accordance with the invention with platinum metal having been diffused into the brazing alloy at diffusion-bonded union 14 and with diffusion of brazing alloy into the platinum metal at 15 near the brazing alloy. It is to be noted that the platinum metal remained solid throughout the process. In practicing the invention components of platinum metal can be united in other relationships, e.g., butt-joint relationship and scarf-joint relationship. Also, in practicing the invention the brazing alloy can be so disposed outside the clearance, or partially within and partially without the clearance, in mutual contact with faying portions of the components that the alloy will flow into the clearance by capillary action when it becomes molten, as those skilled in the brazing art will understand.

In the invention, the brazing operation is carried out at a temperature in excess of the melting point of the brazing alloy, i.e., at least 100° C. above the liquidus of the brazing alloy, in order to ensure that at least the major part of the diffusion takes place while the brazing alloy is liquid.

The platinum metal and brazing alloy can be subjected to temperatures in accordance with the invention by resistance heating or by radiant heating in a furnace. When heating an assembly with palladium-gold alloys in accordance with the invention, the assembly can be heated in the range from about 1160° C. to about 1700° C. for a period of about 0.5 minute to about 150 minutes. Where palladium-copper alloys are used in processes of the invention and the heating is performed under oxidizing conditions, the brazing alloy should be heated to its melting point in a short enough time to avoid oxidizing the copper in the brazing alloy before the copper is diffused in the platinum and, accordingly, it is advantageous to use resistance heating in such processes. In processes of the invention wherein palladium-copper alloys are used, the assemblies can be heated in the range from about 1180° C. to about 1700° C. for a period of about 0.5 minutes to about 150 minutes.

In carrying the invention into practice, it is highly advantageous that the clearance in the joint be as small as possible, advantageously about 0.0005 inch to about 0.01 inch, in order that the brazing metal be wholly converted into a platinum-containing alloy that is as far as possible of uniform platinum content. In addition, if the clearance is small the amount of porosity liable to be produced as a result of different rates of diffusion is reduced.

The brazing metal can be used in the form of foil inserted in the clearance in mutual contact with the platinum metal, the pieces to be joined then being subjected to light pressure, e.g., about 100 pounds per square inch (p.s.i.). Of course, in practicing the invention in this manner the thickness of the foil is substantially the same as the clearance distance and it is advantageous that the clearance distance and, accordingly, the foil thickness be very small in order that the amount of brazing alloy diffused in the platinum metal be very low and also in order that the brazing metal beocme nearly uniformly diffused with platinum.

Brazing metals which can be used in the present invention are alloys of palladium and gold containing at least 60% palladium and alloys of palladium and copper containing at least 70 % palladium.

For the purpose of giving those skilled in the art a better understanding of the invention the following illustrative examples are given.

*Example I*

Two sheets of dispersion-hardened platinum containing about 0.25% of thoria, each about 0.042 inch thick, were disposed in lap-joint brazeable relationship. The amount of overlap was about 0.02 inch and the clearance was about 0.004 inch. Brazing metal in the form of foil was disposed in the clearance and in mutual contact with the two platinum metal sheets. The brazing metal was an essentially binary alloy of about 60% palladium and 40% gold having a liquidus temperature of about 1500° C. The platinum metal sheets and the brazing metal were subjected to a temperature of about 1600° C. for about 30 minutes and the lapping portions of the sheets were concurrently pressed together by light pressure. During this 30 minute heating period the sheets of dispersion-hardened platinum were united into a sound fabrication that was serviceable at temperatures of at least about 1450° C. and the platinum was not melted. For the purpose of making comparative tests, two 0.042 inch thick sheets of the same kind of dispersion-hardened platinum were joined by welding. The sheets united in accordance with the invention and the welded sheets were tested for time to fracture in tension at 1450° C. under a load of 450 p.s.i. The welded joint fractured in the weld after 4 hours whereas the sheets united in accordance with the invention sustained the load for 17 hours and then fractured in the sheet and not in the union. The nominal life of this kind of dispersion-hardened platinum sheet when tested at 1450° C. under a load of 450 p.s.i. is about 17 hours.

*Example II*

Two sheets of dispersion-hardened platinum were united in accordance with the invention by the method set forth in Example I and two sheets of the same kind of dispersion-hardened platinum were welded together. When tested for time to fracture in tension at 1450° C. under a load of 350 p.s.i. the welded joint fractured after 30 hours whereas the sheets united in accordance with the invention sustained the load for 88 hours.

*Example III*

Two sheets of dispersion-hardened platinum contains about 0.25% of thoria each about 0.042 inch thick, are disposed in lap-joint brazeable relationship with an overlap of about 0.02 inch and a clearance of about 0.004 inch. Brazing metal in the form of foil is disposed in the clearance in mutual contact with the two platinum sheets. The brazing metal is an essentially binary alloy containing about 83% palladium and about 17% copper having a liquidus temperature of about 1390° C. The platinum metal sheets are subjected to a temperature of about 1490° C. for about 10 minutes and the lapping portions of the sheets are concurrently pressed together by light pressure. During this period the sheets have become united into a sound fabrication that is serviceable at temperatures up to about 1550° C. and the platinum alloy has not been melted. When tested to fracture in tension the fabrication fractures in the sheet portion and not in the union.

The present invention is applicable to the production of platinum metal articles, fabrications and structures, including interalia crucibles, crucible linings, furnace linings and orifice linings that are suitable for service at temperatures of 1450° C. and higher. The present invention is particularly applicable to the production of platinum metal crucibles and other platinum metal apparatus for melting, containing, pouring and otherwise processing molten glass at temperatures from about 1100° C. to about 1500° C. Platinum metal components which can be united in accordance with the invention include platinum metal sheets, plates, tubes, bars, extrusions, and forged shapes.

It is to be observed that the present invention provides processes for uniting faying portions of at least one component of platinum metal to produce structures, including articles and fabrications, suitable for service at temperatures of 1450° C. and higher which comprise placing the faying portions in mutual contact with a brazing alloy, said brazing alloy being an essentially binary alloy of palladium and a metal selected from the group consisting of about 0% to about 100% gold and about 0% to about 100% copper, with the faying portions of the component being about 0.0005 inch to about 0.01 inch apart, subjecting the brazing alloy and at least the faying portions of the components to a temperature that exceeds the melting point of the brazing alloy by at least 100° C. and is substantially below the melting point of the platinum metal of the faying portions to melt the brazing alloy and maintaining the faying portions at a temperature that exceeds the temperature of the brazing alloy by at least about 100° C. and is substantially lower than the melting point of the platinum metal of the faying portions to diffuse platinum metal of the component into the brazing alloy and raise the melting point of the brazing alloy to a temperature above about 1450° C. and above the temperature to which the article, fabrication or structure is to be subjected in service while maintaining the relative positions of the faying portions.

Furthermore, the invention provides articles, fabrications and structures comprising at least two portions of platinum metal united by a diffusion-bonded union comprising an alloy containing a major proportion of platinum plus palladium and a minor proportion of a metal selected from the group consisting of gold and copper. The products of the invention are entirely resistant to melting at temperatures up to 1450° C. and higher; for example, such products made using palladium-gold brazing alloys are serviceable at temperatures up to 1700° C. and products of the invention made with palladium-copper brazing alloys are serviceable at temperatures up to 1700° C.

Moreover, the invention provided articles, fabrications and structures of platinum metal, especially of dispersion-hardened platinum, used in contact with molten glass at temperatures of 1450° C. and higher, said articles, fabrications and structures comprising a diffusion-bonded union consisting of a major proportion of platinum plus palladium and a minor proportion of metal selected from the group consisting of gold and copper.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for uniting faying portions of at least one component of platinum metal selected from the group consisting of platinum, dispersion-hardened platinum, platinum-base alloys and dispersion-hardened platinum-base alloys, said platinum-base alloys and said dispersion-hardened platinum-base alloys containing at least one metal from the group consisting of up to about 40% iridium, up to about 5% osmium, up to about 50% palladium, up to about 40% rhodium, and up to about 15% ruthenium with the balance essentially platinum in amounts greater than about 50% to produce a structure suitable for service at temperatures of 1450° C. and higher which comprises placing the faying portions in mutual contact with a brazing alloy, said brazing alloy being an essentially binary alloy of palladium and a metal selected from the group consisting of gold in an amount about 0% to about 100% and copper in an amount about 0% to about 100%, with the faying portions of the component being about 0.0005 inch to about 0.01 inch apart, subjecting the brazing alloy and at least the faying portions of the components to a temperature that exceeds the melting point of the brazing alloy by at least about 100° C. and is substantially below the melting point of the platinum metal of the faying portions to melt the brazing alloy and maintaining the faying portions at a temperature that exceeds the temperature of the brazing alloy by at least about 100° C. and is substantially lower than the melting point of the platinum metal of the faying portions for a period from about 0.5 minute to about 150 minutes to diffuse platinum metal of the component wholly into the brazing alloy and raise the melting point of the brazing alloy to a temperature above about 1450° C. and above the temperature to which the structure is to be subjected in service while maintaining the relative positions of the faying portions.

2. A process for uniting faying portions of at least one component of platinum metal selected from the group consisting of platinum, dispersion-hardened platinum, platinum-base alloys and dispersion-hardened platinum-base alloys, said platinum-base alloys and said dispersion-hardened platinum-base alloys containing at least one metal from the group consisting of up to about 40% iridium, up to about 5% osmium, up to about 50% palladium, up to about 40% rhodium, and up to about 15% ruthenium with the balance essentially platinum, to produce a structure suitable for service at temperatures up to about 1700° C. which comprises placing the faying portions in mutual contact with a brazing alloy, said brazing alloy consisting essentially of about 0% to about 100% gold with the balance essentially palladium, with the clearance between the faying portions of the component being about 0.0005 inch to about 0.01 inch, subjecting the brazing alloy and at least the faying portions of the components to a temperature in the range from about 1160° C. to about 1700° C. to melt the brazing alloy and maintaining the faying portions at a temperature in said range for a period from about 0.5 minute to about 150 minutes to diffuse platinum metal of the component into the brazing alloy and raise the melting point of the brazing alloy to a temperature above about 1700° C.

3. A process as set forth in claim 2 wherein the brazing alloy consists essentially of at least 60% palladium with the balance being essentially gold.

4. A process for uniting faying portions of at least one component of platinum metal selected from the group consisting of platinum, dispersion-hardened platinum, platinum-base alloys and dispersion-hardened platinum-base alloys, said platinum-base alloys and said dispersion-hardened platinum-base alloys containing at least one metal from the group consisting of up to about 40% iridium, up to about 5% osmium, up to about 50% palladium, up to about 40% rhodium, and up to about 15% ruthenium with the balance essentially platinum, to produce a structure suitable for service at temperatures of at least about 1700° C. which comprises placing the faying portions in mutual contact with a brazing alloy, said brazing alloy consisting essentially of about 0% to about 100% copper with the balance essentially palladium, with the clearance between the faying portions of the component being about 0.0005 inch to about 0.01 inch, subjecting the brazing alloy and at least the faying portions of the components to a temperature in the range from about 1180° C. to about 1700° C. to melt the brazing alloy and maintaining the faying portions at a temperature in said range for a period from about 0.5 minute to about 150 minutes to diffuse platinum metal of the component into the brazing alloy and raise the melting point of the brazing alloy to a temperature above about 1700° C.

5. A process as set forth in claim 3 wherein the brazing alloy consists essentially of at least 70% palladium with the balance being essentially copper.

References Cited by the Examiner

UNITED STATES PATENTS

| | | |
|---|---|---|
| 1,940,850 | 12/1933 | Derby. |
| 2,474,039 | 6/1949 | Davignon. |
| 2,691,815 | 10/1954 | Bessenkool _____ 29—194 |
| 2,897,584 | 8/1959 | Schumfelt _____ 29—199 |
| 2,984,894 | 5/1961 | Hill et al. _____ 29—199 |
| 3,162,512 | 12/1964 | Robinson _____ 29—199 |

HYLAND BIZOT, *Primary Examiner.*